(12) United States Patent
Reignault et al.

(10) Patent No.: US 9,545,765 B2
(45) Date of Patent: Jan. 17, 2017

(54) METHOD OF BLOCKING AN OPTICAL LENS

(71) Applicant: ESSILOR INTERNATIONAL (COMPAGNIE GENERALE D'OPTIQUE), Charenton le Pont (FR)

(72) Inventors: Marc Reignault, Charenton le Pont (FR); Pascal Le Bouillonnec, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 166 days.

(21) Appl. No.: 14/365,954

(22) PCT Filed: Dec. 6, 2012

(86) PCT No.: PCT/EP2012/074641
§ 371 (c)(1),
(2) Date: Jun. 16, 2014

(87) PCT Pub. No.: WO2013/087505
PCT Pub. Date: Jun. 20, 2013

(65) Prior Publication Data
US 2014/0352885 A1    Dec. 4, 2014

(30) Foreign Application Priority Data

Dec. 15, 2011  (EP) .................................... 11306671

(51) Int. Cl.
*B32B 37/00* (2006.01)
*B29D 11/00* (2006.01)
*B24B 13/005* (2006.01)
*G02B 3/00* (2006.01)
*B29L 11/00* (2006.01)

(52) U.S. Cl.
CPC ..... *B29D 11/00317* (2013.01); *B24B 13/0055* (2013.01); *G02B 3/00* (2013.01); *B29L 2011/00* (2013.01); *Y10T 156/1089* (2015.01)

(58) Field of Classification Search
CPC .................... Y10T 156/1089; Y10T 156/1092; Y10T 156/1093; B29D 11/00317; B29D 11/00336; B29D 11/00326; B24B 13/0055
USPC ...................... 156/64; 451/384, 390, 5, 6, 42
See application file for complete search history.

(56) References Cited

U.S. PATENT DOCUMENTS

| 4,525,044 A * | 6/1985 | Bauman | B29D 11/00317 351/159.02 |
| 6,036,013 A | 3/2000 | Chen | |
| 2003/0214139 A1* | 11/2003 | Nigam | A61F 2/0095 294/1.2 |

(Continued)

FOREIGN PATENT DOCUMENTS

EP        2 199 021        6/2010

*Primary Examiner* — John Goff
(74) *Attorney, Agent, or Firm* — Cozen O'Connor

(57) ABSTRACT

A method of blocking a lens member having a surface to be manufactured on a lens holding unit, the method comprising: a lens member providing step during which a lens member comprising engraved markings is provided, a contrast providing step during which contrast elements are placed on the engraved markings, a taping step during which the marked surface of the lens member is taped with an adhesive tape over the contrast elements, and a blocking step during which the lens member is blocked on a lens holding unit via the taped surface.

8 Claims, 5 Drawing Sheets

(56) References Cited

U.S. PATENT DOCUMENTS

2004/0166784 A1* 8/2004 Katzman ............. B23B 31/4073
　　　　　　　　　　　　　　　　　　　　　451/42

* cited by examiner

METHOD OF BLOCKING AN OPTICAL LENS

RELATED APPLICATIONS

This application is a U.S. National Phase Application under 35 USC 371 of International Application PCT/EP2012/074641 filed Dec. 6, 2012.

This application claims the priority of European application No. 11306671.6 filed Dec. 15, 2011, the entire content of which is hereby incorporated by reference.

The present invention relates to a method of blocking a lens member having a surface to be manufactured on a lens holding unit, in particular of blocking an optical lens.

BACKGROUND OF THE INVENTION

An optical lens is typically made of plastic or glass material and generally has two opposing surfaces which co-operate with one another to provide a required corrective prescription. When the positioning or shape of one of these surfaces with respect to the other is inaccurate, optical errors can occur.

Manufacturing of an optical lens to the required prescription requirements typically includes machining the surface of a semi-finished lens or lens blank. Typically, a semi-finished lens has a finished surface, for example the front surface and an unfinished surface, for example the back surface. By machining the back surface of the lens to remove material, the required shape and positioning of the back surface with respect to the front surface for the desired corrective prescription can be generated.

During manufacturing of the lens it is important that the semi finished lens is securely maintained in an accurate position on a lens holding unit during the various manufacturing operations in order to prevent the generation of optical errors.

Conventionally, a semi-finished lens is provided with engraved markings on the finished surface. The engraved markings define a reference system of the finished surface of the lens.

So as to manufacture accurately the unfinished surface of the semi-finished lens, the semi-finished lens is maintained by blocking the finished surface of the lens on a lens holding unit. Various materials may be employed to secure the semi-finished lens to the lens holding unit. These materials include for example glues or low temperature fusible metal alloys.

The use of such materials requires that the finished surface of the lens be protected prior to being blocked on the lens holding unit. A protective tape is generally placed on the finished surface prior to blocking the semi-finished lens.

The protective tape can make the viewing of the engraved markings, for example trough the semi-finished lens, difficult. Thus, it may be difficult to accurately determine the position in which the semi-finished lens is blocked. An inaccurate estimation of the position of the semi-finished lens on the lens holding unit may introduce an inaccurate position of the manufactured surface relative to the unfinished surface.

SUMMARY OF THE INVENTION

One object of the present invention is to provide a method that increases the accuracy of the positioning of both surfaces of the optical lens with respect of one to the other.

In accordance with a first aspect of the invention there is provided a method of blocking a lens member having a surface to be manufactured on a lens holding unit. The method comprising:

a lens member providing step during which a lens member comprising a marked surface, a surface to be manufactured and a reference system identified by at least two engraved markings on the marked surface of the lens member are provided, a contrast providing step during which contrast elements are placed on the engraved markings of the marked surface of the lens member, a taping step during which the marked surface of the lens member is taped with an adhesive tape over the contrast elements, a blocking step during which the lens member is blocked on a lens holding unit via the taped surface.

Advantageously, the use of contrast elements during the blocking method according to the invention improves the visibility of the engraved markings on the marked surface. Thus, the accuracy of the positioning of the marked surface is improved.

According to further embodiments which can be considered alone or in combination:

during the contrast providing step the contrast elements are stick on the engraved markings;

the contrast elements comprise paper or aluminum foil or pvc coating with mirror effect placed on the engraved markings; and/or the contrast elements are maintained in place by stickers.

Another aspect of the invention relates to a method of manufacturing an optical lens, the method comprising the steps of:

blocking a lens member at a first positioning on a lens holding unit using a blocking method according to the invention;

determining the first positioning of the lens member with respect to the lens holding unit;

comparing the first positioning of the lens member with a predetermined positioning in order to determine a positioning error between the first positioning and the predetermined positioning;

determining a surface positioning of the surface to be manufactured with respect to the lens holding unit according to the positioning error; and configuring operational parameters of a lens manufacturing tool in order to manufacture a surface according to the determined surface positioning such that the desired optical properties of the optical lens are respected.

According to further embodiments which can be considered alone or in combination:

determining the first positioning of the lens member comprises the steps of determining:

the orientation of the nasal-temporal axis of the lens member and the decentration of the lens member with respect to the lens holding unit and wherein the geometry of the surface of the lens member in contact with the lens holding unit and the geometrical configuration of the lens holding unit ring supporting the lens member may be used to determine the positioning of the lens member with respect to the lens holding unit in terms of six degrees of freedom;

determining the first positioning of the lens member comprises determining the positioning of the engraved markings on an opposing surface of the lens member to the surface being manufactured with respect to lens holding unit reference markings on the lens holding unit; and/or the method further comprises viewing the engraved markings through the lens member and wherein the refractive properties of the lens member are taken into account when determining the positioning of the lens engraved markings.

Another aspect of the invention relates to a computer program product for a data processing device, the computer program product comprising a set of instructions which, when loaded into the data processing device, causes the data processing device to perform the method according to the invention.

Another aspect of the invention relates to a computer-readable medium having computer-executable instructions to enable a computer system to perform the method according to an embodiment of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the context of the present invention the term "lens member" can refer to a lens blank, an uncut lens, a semi-finished lens. It will be understood that the method can thus be applied to any stage of the manufacturing process of an ophthalmic lens.

In the sense of the invention, the term "contrast element" corresponds to an element having an optical absorbance greater than the adhesive tape.

Figure 1:
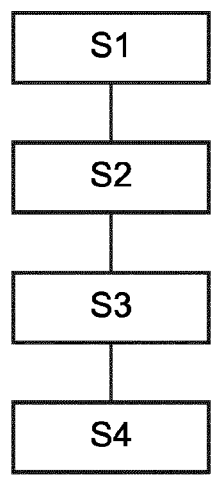
FIG. 1 is a flowchart of the steps of an embodiment of the method according to the invention.

As illustrated on FIG. 1, according to an embodiment of the method according to the invention comprises:

a lens member providing step S1,
a contrast providing step S2,
a taping step S3, and
a blocking step S4.

During the lens member providing step S1 a lens member comprising a marked surface, a surface to be manufactured and a reference system identified by at least two engraved markings on the marked surface are provided.

The engraved markings 111 have a depth of a few micrometers, for example a depth greater or equal to 0.5 micrometer, for example greater or equal to 1 micrometer, and smaller or equal to 10 micrometers, for example smaller or equal to 5 micrometers, so as to limit the risk of disturbing the wearer of the resulting finished optical lens.

Examples of engraved markings are given in ISO standard NF EN ISO 8980-2.

During the contrast providing step S2, contrast elements are placed on the engraved markings of the marked surface of the lens member.

According to an embodiment of the invention, the contrast elements are stick on the engraved markings. Advantageously, the contrast elements are easily put in place and maintained according to such embodiment.

The contrast elements can be selected from paper, aluminium foil, pvc coating with mirror effect, or any other contrast element known from the skilled person.

According to an embodiment of the invention, the contrast elements are maintained in place using stickers, for example ring reinforcement stickers.

During the taping step S3, the marked surface of the lens member is taped with an adhesive tape over the contrast elements.

Examples of suitable adhesive tapes are given in U.S. Pat. No. 6,036,013.

Finally, during the blocking step S4, the lens member is blocked on a lens holding unit via the taped surface.

The invention further relates to a method of manufacturing an optical lens using a blocking method according to the invention.

A first embodiment of a method and apparatus of manufacturing an optical lens from a semi finished lens is described with reference to FIGS. 2A to 8B.

Figure 5:
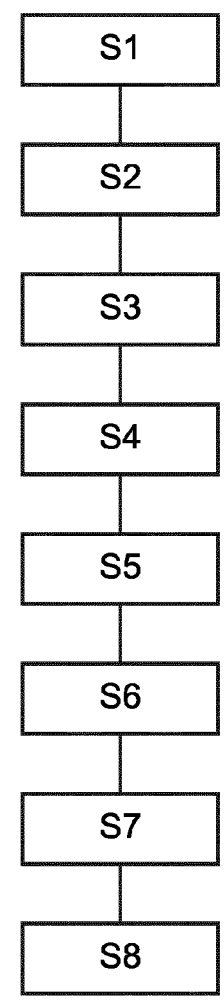
FIG. 5 is a flow chart of the steps of a method according to an embodiment of the invention.

As illustrated on FIG. 5, according to an embodiment of the method of manufacturing an ophthalmic lens according to the invention may comprise:
 a lens member providing step S1,
 a contrast providing step S2,
 a taping step S3,
 a blocking step S4,
 a first positioning determining step S5,
 a comparing step S6,
 a surface positioning determining step SS7, and
 a configuring parameters step S8.

According to an embodiment of the invention, during the lens member providing step S1, a semi finished lens member is provided.

Semi finished lens member 10 has a preformed front surface 11 that, in use of the resulting finished optical lens, is disposed nearest the object being viewed and an opposing surface 12 to be modified by the manufacturing process to provide the back surface 13 of the finished optical lens, represented by the dotted line. Opposing surface 12 is machined by a machining tool so that the back surface 13 is orientated with respect to and distanced from the front surface 12, according to the required optical prescription.

Figure 2A:
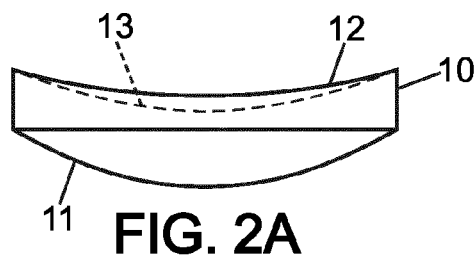
FIG. 2A is a perspective view of an optical lens member to be manufactured according to embodiments of the invention.

While in this embodiment of the invention, the back surface of the optical lens is formed by the machining process, it will be understood, that in alternative embodiments of the invention both or either surfaces of the lens may be formed by the machining process. Moreover, although the optical surface 13 to be manufactured is represented in FIG. 2A as concave, it will be appreciated that the optical surface 13 could equally well be convex or any other curved surface.

With reference to FIG. 1B, engraved markings 111 are provided on the preformed front surface 11 of the semi finished lens member 10 as reference features for positioning purposes.

According to an embodiment of the invention, during the contrast providing step S2, contrast elements are placed on the engraved markings of the marked surface of the lens member.

Indeed, usually the engraved markings 111 are visible through the semi finished lens member 10 from the opposing side 12 of the lens member 10. However, when the front surface is protected by the protective tape placed prior to the blocking step, it becomes more difficult to detect the engraved markings.

Prior to placing the semi finished lens member 10 on the lens blocking device 20 contrast elements are placed on the engraved markings on the preformed front surface 11 of the lens member 10 and the adhesive tape 23 is placed on the preformed front surface 11 of the lens member 10.

To overcome this difficulty, the invention proposes to place contrast elements 112 on the engraved markings prior to the taping of the finished surface.

Advantageously, the detection of the engraved markings is easier, thus helping the operator to properly determine the relative position of the reference system defined by the engraved markings and the reference system of the lens holding unit.

According to an embodiment of the invention, during the taping step S3 the lens member is taped with an adhesive tape over the contrast elements. Further to the taping step, the lens member is blocked on a lens holding unit via the taped surface during the blocking step S4.

Figure 2B:
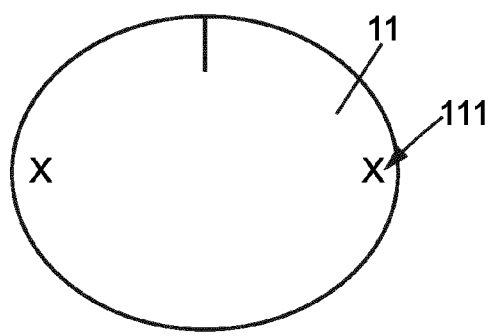
FIG. 2B is a planar view of a preformed surface of a semi finished lens member to be machined according to embodiments of the invention.
Figure 2C:
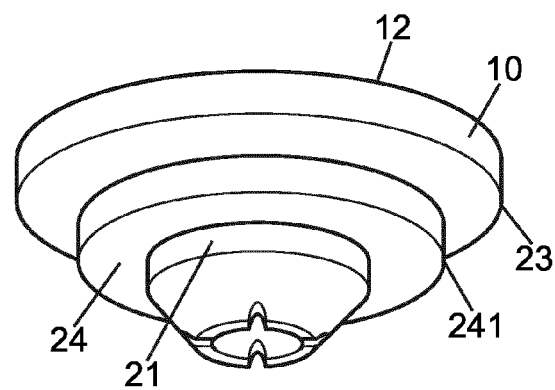
FIG. 2C is a perspective view of a lens member and blocking device according to an embodiment of the invention.
Figure 2D:
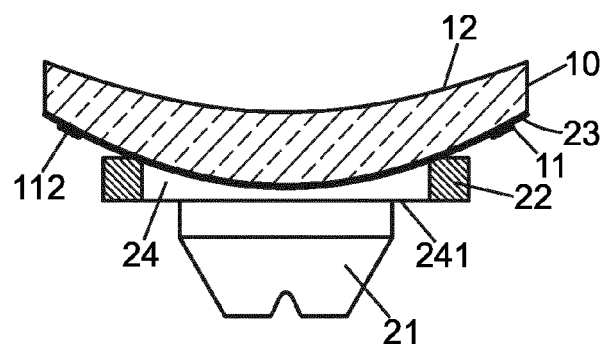
FIG. 2D is a cross-sectional view of a lens member and blocking device according to an embodiment of the invention.

Referring now to FIGS. 2A and 2B, a lens blocking device 20 for blocking lens member 10 in the correct positioning for manufacturing processes comprises a lens holding unit 21, a blocking ring 22 and an adhesive tape 23 for placing between the front surface 11 of the lens member 10 and the blocking device 20. Blocking cast material 24 is poured into the cavity defined by the lower surface of the optical lens 10, the lens holding unit 21 and the blocking ring 22. The blocking cast material 24 cools to solidify in order to provide a blocking support for the optical lens 10 at the desired positioning for machining. The lower surface or bearing surface 241 of blocking material 241 acts as a reference surface for determining the thickness at the centre of the lens member 10.

Figure 3:
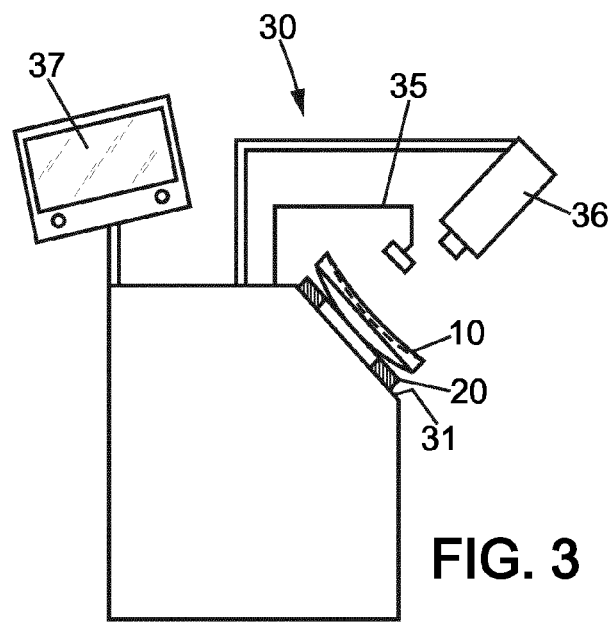
FIG. 3 is schematic view of a lens member on a lens blocking station according to an embodiment of the invention.

Lens blocking device 20 is part of a lens blocking station as illustrated in FIG. 3. Lens blocking station 30 comprises the blocking device 20 disposed on a top plate 31 of the lens blocking station 30 and a clamping arm 35 which may be moved from a free position to a clamping position in which it holds the lens member 10 in place on the blocking device 20. Lens blocking station 30 also includes a digital camera 36 for taking an image of the positioning of the lens member 10 on the blocking device 20, and a screen 37 for viewing the image from the digital camera 36. The lens member 10 may also be directly viewed by an operator without using the digital camera 36.

Figure 4:
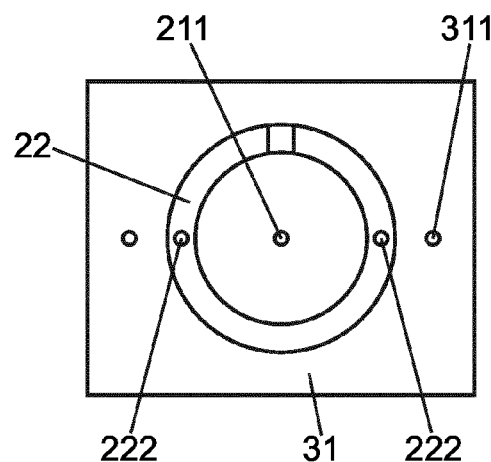
FIG. 4 is a planar view of the contact surface of the blocking device and blocking plate of the lens blocking station of FIG. 3.

Referring to FIG. 4, blocking device 20 is provided with lens holding unit reference markings including alignment markings 222 provided on the blocking ring 22 and a central marking 211. In the case where an insert or a block is provided in the centre of the blocking ring, the central marking 211 is provided on the insert or block. The top plate 31 of the lens blocking station 30 is provided with reference markings 311 for guiding the positioning of the blocking ring 22 on the top plate 31. Alignment markings 222 on the ring may include a hole for receiving corresponding positioning projections on the top plate 31 allowing the ring 22 to be correctly positioned on the blocking plate 31. The alignment markings 222 may be further provided with a line markings following a reference axis to aid alignment.

With reference to FIG. 5 the blocking step S4 of blocking an optical lens according to a first embodiment of the invention involves placing the semi finished lens member 10 on the lens blocking device 20. The lens member 10 is provided with contrast elements on the engraved markings and an adhesive tape 23 on the preformed front surface 11.

The lens member 10 is positioned on the blocking device 20 with the preformed surface, which in this case is the front surface 11, being placed facing towards and in contact with the blocking device 20. The surface 12 to be machined is thus orientated to face upwards away from the blocking device 20.

According to an embodiment of the invention, during the first positioning determining step S5 the position of the lens member with respect to the lens holding unit is determined.

After the lens member 10 has been placed on the blocking device 20, the operator may make an initial judgement as to the quality of the positioning by direct visualisation of the engraved markings 111 of lens member 10 with respect to the reference markings of the blocking device 20 before continuing the blocking process.

If the operator is not satisfied with the initial positioning, the lens member 10 may be repositioned manually or automatically on the blocking device 20. Once the operator is satisfied with the positioning the clamping arm 35 may be put in place to hold the lens member 10 in position on the blocking device 20.

Figure 6:
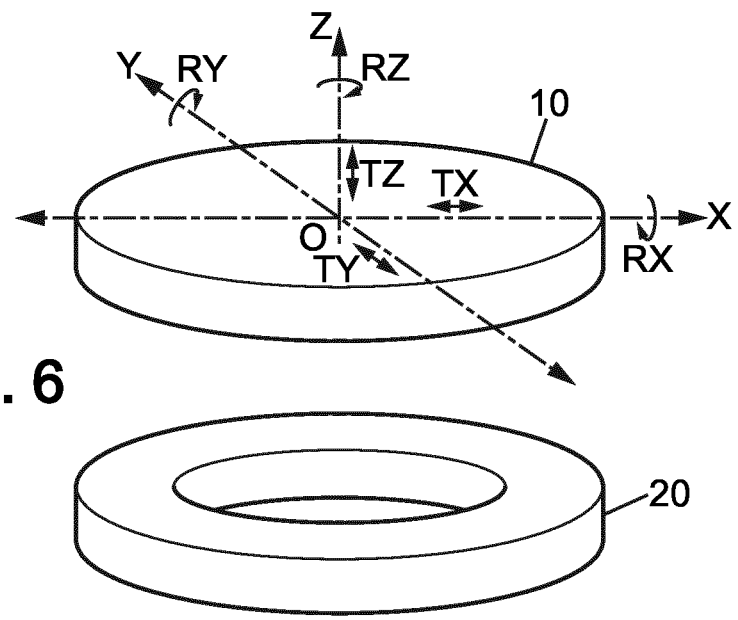
FIG. 6 is a perspective view of a lens member illustrating the reference frame of the lens member.

With reference to FIG. 6 the positioning of the lens member 10 in a reference frame on lens blocking device 20 can be defined by:
- translation TX and TY in a horizontal plane XY with decentration TX, TY, defining the displacement of the centration point O of the lens in the X and Y direction, respectively in the horizontal plane;
- translation TZ along a vertical axis,
- orientation RZ of the lens member about the vertical Z axis, also referred to as orientation of the nasal-temporal axis of the lens member;
- orientation RY of the lens member about the horizontal Y axis,
- orientation RX of the lens member about the horizontal X axis.

Figure 7:
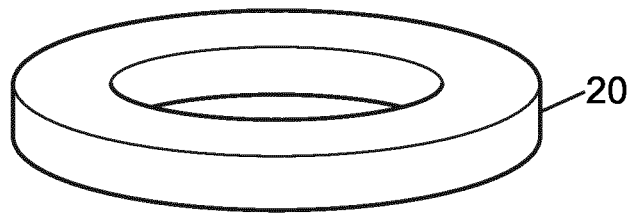
FIG. 7 is a schematic view of a digital camera viewing the lens member according to an embodiment of the invention.
Figure 7:
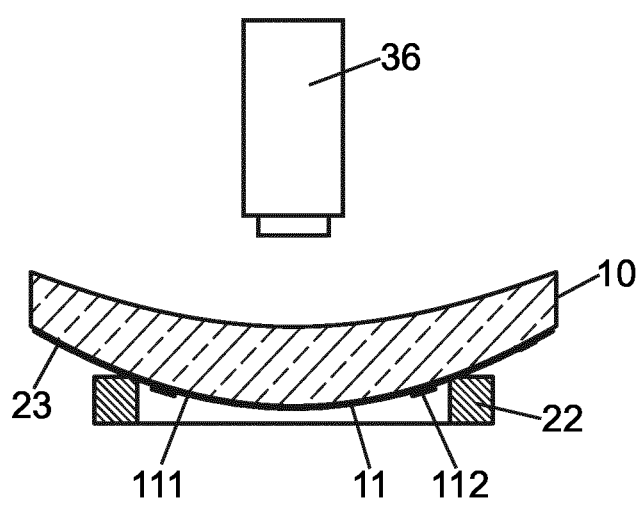
Figure 8A:
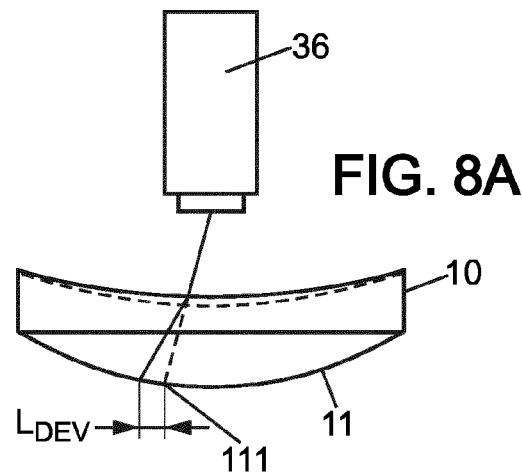
FIG. 8A schematically illustratews the effect of the refractive properties of the lens member 10 on the determination of the position of the engraved markings of the lens member.

The positioning of lens member 10 on the blocking device 20 can then be quantified using the digital camera 36. In order to measure the positioning of the lens member 10, the engraved markings 111 provided on the lower surface of the lens member and the reference markings 211 and 222 provided on the blocking device 20 are viewed through the lens member 10 and adhesive tape 23 by means of the camera 36 which is positioned along the cylindrical axis extending through the central marking 211 of the blocking device 20 as illustrated in FIG. 7. Deviation Ldev of the image of the engraved markings 111 located on the front surface 11 of the lens member 10 due to refractive properties of the lens member 10 is taken into account when making measurements of the positioning of engraved markings 111 of the lens member 10 relative to the reference markings on the blocking ring 22 as illustrated in FIG. 8A.

The positioning of the engraved markings 111 on the lower surface of the lens member relative to the reference markings 211 and 222 of the blocking device 20 is determined during the comparing step S6.

Figure 8B:
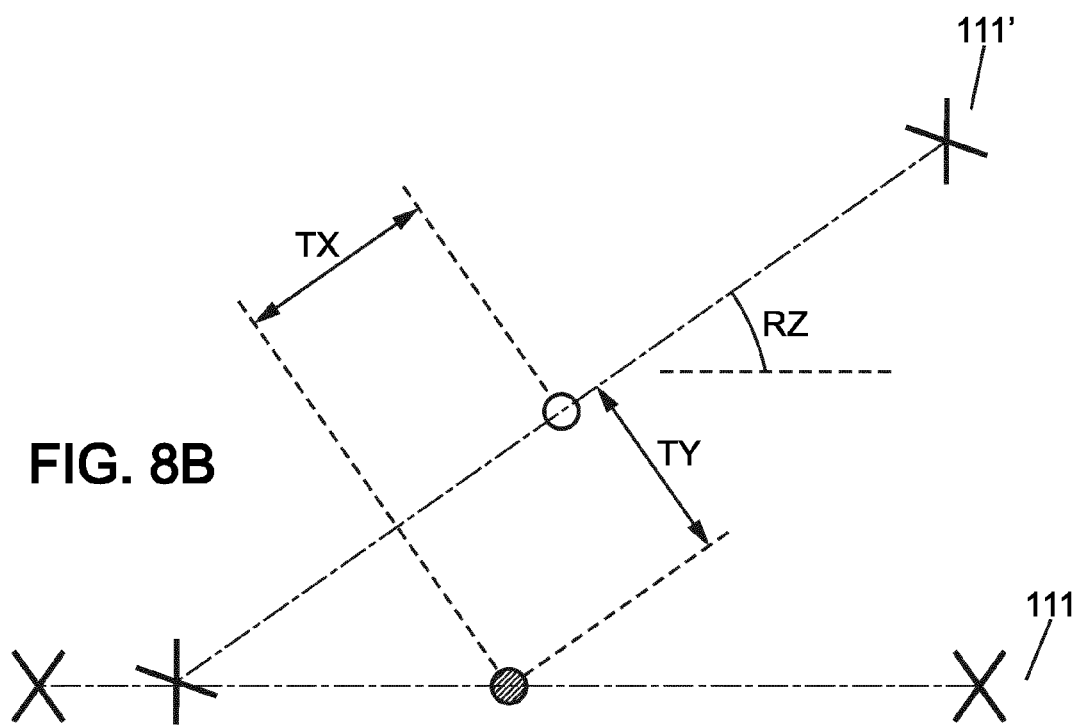
FIG. 8B schematically illustrates determining the positioning of the imaged reference markings according to an embodiment of the invention.

The camera 36 places the image of the engraved markings 111' in the reference frame of a model M111 of the reference markings corresponding to an optimised positioning of the lens member 10 as illustrated in FIG. 8B. The reference frame of the markings of model M111 is defined with respect to the reference frame of the blocking device 20 in a calibration step.

The orientation and direction of the nasal temporal axis RZ of the semi finished lens member 10 is determined by measuring the orientation of the axis of the engraved markings 111' with respect to the axis of the model engraved markings M111. Using the central reference point of the engraved markings 111' the translation distances in the horizontal plane TX and TY can also be measured, i.e. the decentration or off centering of the lens member 10. This may be performed by calculating the transformation the image of the engraved markings 111 is subjected to through the lens member 10.

Alternatively in the case of a decentred semi finished lens, by taking account of the nasal-temporal prism and then taking account of the scaling to which the image 111' of the engraved markings 111 is subjected to through the lens member 10, knowing the distance between the engraved markings 111 on the front surface 11 of the lens member 10, and knowing that the position of the engraved markings may be interpolated. If Dmes corresponds to the measured distance between the engraved markings and Dth is the theoretical distance between the engraved markings the scaling factor can be determined as r=Dmes/Dth.

The estimation of the decentration Tx and Ty then becomes TX=TXmes x1/r and TY=TYmes x1/r where TXmes and TYmes correspond to the measured translations TX and TY of the decentration respectively.

Once the three degrees of freedom RZ, TX and TY have been determined the remaining three degrees of freedom TZ, RX and RY may be mathematically deduced therefrom by taking account of the geometry of the blocking ring 22, as well as the geometry of the preformed front face 12 of the lens member and knowing that the lens member is stably supported by at least three bearing points on the support ring 22.

Once the positioning of the lens member has thus been determined with respect to the lens holding unit 21, in step S7 the determined positioning of the lens member 10 can then be compared with a predetermined optimised positioning in order to provide a measurement of the positioning error.

At this stage if the positioning error is not within a predetermined tolerance, the lens member may be repositioned before continuing and steps S6 to S7 may be repeated in order to determine the new positioning error.

Once the positioning error has been determined the actual positioning of the front surface 11 of the lens member 10 with respect to the blocking device 20 is known. The required positioning of the surface 13 to be generated with respect to the reference lens holding unit 21 can thus be deduced during the configuration step S8.

By configuring the machining tool according to the positioning error surface 12 can be machined to provide a surface 13 with the required positioning with respect to surface 11 to respect the thickness and desired optical characteristics of the desired optical lens. Configuring the machining tool involves providing the tool with surface positioning data so that the machining tool may be controlled to provide the desired surface positioning of the back surface.

Alternatively, completed surface data defining the surface to be manufactured can be sent directly to the machining tool. In this case the data defining the positioning of the surface 13 to be manufactured is determined from the positioning error prior to configuration data being delivered to the machining tool. The machining tool is configured accordingly.

Before the step of machining surface 12 to generate desired optical back surface 13, the cavity defined by the blocking ring 22, lens holding unit 21 and lens member 10 is filled with the blocking material 24. When blocking material 24 has solidified to support the lens member 10 in the measured positioning the clamping arm 35 is then released. The blocked lens member 10 can then be mounted on a machining apparatus for the machining process.

In step S8 the surface 13 to be manufactured for the optical lens can be determined. Machining apparatus is then configured to take into account the determined positioning error so that the machining tool can be positioned with respect to surface 12 in order to remove material in such a way that the desired surface 13 is generated at the desired positioning. An optical lens with optical properties conforming to the optical prescription can thus be created.

The method according to the invention may also be used with a prismatic blocking device as disclosed in EP 2 199 021.

Although the present invention has been described hereinabove with reference to specific embodiments, the present invention is not limited to the specific embodiments, and modifications will be apparent to a skilled person in the art which lie within the scope of the present invention.

For instance, although in the foregoing embodiments of the invention the positioning error is determined after the clamping arm has been put in place and before the blocking material is poured into the cavity, it will be appreciated that the positioning error may be determined at different stages of the blocking procedure. For example, in other embodiments of the invention, the positioning of the lens member measured and the positioning error determined:

before the clamping arm is put in place;
after the clamping arm has been released and before the blocked semi finished lens member is removed from the blocking apparatus;
after the semi finished lens member has been mounted in the machining apparatus.

It will be appreciated that the estimation of the positioning error may be carried out at more than one stage during the blocking procedure. For example the positioning error may be determined before the cavity of the blocking device is filled by the blocking material and once again when the lens member is mounted on the machining apparatus.

While the foregoing examples have been described with reference to the manufacture of an ophthalmic lens, it will be appreciated that the method of the invention may be applied more generally to the manufacture of other types of optical lens, for example optical lens used in telescopes and the like.

Many further modifications and variations will suggest themselves to those versed in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of blocking a lens member having a surface to be manufactured on a lens holding unit, the method comprising:
a lens member providing step during which a lens member comprising a marked surface, a surface to be manufactured and a reference system identified by at least two engraved markings on the marked surface of the lens member are provided;
a contrast providing step during which contrast elements are placed on the engraved markings of the marked surface of the lens member, wherein the contrast elements:
comprise paper or aluminum foil or polyvinyl chloride coating with mirror effect placed on the engraved markings, or
are maintained in place by stickers;
a taping step during which the marked surface of the lens member is taped with an adhesive tape over the contrast elements; and
a blocking step during which the lens member is blocked on a lens holding unit via the taped surface.

2. A method according to claim 1, wherein during the contrast providing step the contrast elements are stuck on the engraved markings.

3. A method of manufacturing an optical lens, the method comprising the steps of:
blocking a lens member at a first positioning on a lens holding unit using a blocking method according to claim 1;
determining the first positioning of the lens member with respect to the lens holding unit;
comparing the first positioning of the lens member with a predetermined positioning in order to determine a positioning error between the first positioning and the predetermined positioning;
determining a surface positioning of the surface to be manufactured with respect to the lens holding unit according to the positioning error; and
configuring operational parameters of a lens manufacturing tool in order to manufacture a surface according to the determined surface positioning such that the desired optical properties of the optical lens are respected.

4. A method according to claim 3, wherein determining the first positioning of the lens member comprises the steps of determining:
the orientation of the nasal-temporal axis of the lens member; and
the decentration of the lens member with respect to the lens holding unit and wherein the geometry of the surface of the lens member in contact with the lens holding unit and the geometrical configuration of a ring of the lens holding unit supporting the lens member may be used to determine the positioning of the lens member with respect to the lens holding unit in terms of six degrees of freedom.

5. A method according to claim 3, wherein determining the first positioning of the lens member comprises determining the positioning of the engraved markings on an opposing surface of the lens member to the surface being manufactured with respect to lens holding unit reference markings on the lens holding unit.

6. A method according to claim 5, comprising viewing the engraved markings through the lens member and wherein the refractive properties of the lens member are taken into account when determining the positioning of the engraved markings.

7. A method according to claim 4, wherein determining the first positioning of the lens member comprises determining the positioning of the engraved markings on an opposing surface of the lens member to the surface being manufactured with respect to lens holding unit reference markings on the lens holding unit.

8. A method according to claim 7, comprising viewing the engraved markings through the lens member and wherein the refractive properties of the lens member are taken into account when determining the positioning of the engraved markings.

\* \* \* \* \*